Patented Nov. 16, 1948

2,453,890

UNITED STATES PATENT OFFICE 2,453,890

PROCESS FOR THE OXIDATION OF CYCLIC ETHERS

John George Mackay Bremner and David Gwyn Jones, Norton-on-Tees, England, assignors to Imperial Chemical Industries Limited, a corporation of Great Britain No Drawing. Application February 13, 1947, Serial No. 728,386. In Great Britain February 26, 1946

10 Claims. (Cl. 260—344)

This invention relates to the oxidation of cyclic ethers, such as for example, tetrahydrofuran and tetrahydropyran.

According to the present invention cyclic ethers are converted to lactones by oxidation in the liquid phase at elevated temperature by means of an oxygen-containing gas, preferably in the presence of an oxidation catalyst.

The process is of particular value in its application to tetrahydrofuran and tetrahydropyran whereby there are obtained respectively α-butyrolactone and α-valerolactone, but it may also be applied to substituted cyclic ethers. 2,5-dihydrofuran yields the lactone of α-hydroxy crotonic acid.

Air and oxygen are suitable gases for effecting the oxidation.

Suitable temperatures for carrying out the reaction are 70°–200° C., but it is preferred to operate at about 100°–140° C. Provided the liquid phase is present, the pressure may be varied over a wide range. The higher the pressure, the greater in general is the reaction velocity. Since, however, with increasing pressure there is increasing tendency for the reaction to get out of control it is preferred to operate at pressures up to 10 atmospheres gauge. If pure oxygen is used it is desirable to employ lower temperatures and lower pressures than with air or other mixtures of oxygen and inert gases.

Oxidation catalysts comprising metal compounds or organic compounds may be used in the process. Among the former may be mentioned compounds of cobalt, manganese, iron, cerium, lead, copper, and chromium. The organic acid salts of the metals are particularly suitable, e. g. the salts of mono-carboxylic acids, such as the stearates, linoleates, naphthenates and acetates. Cobalt stearate has been found very suitable. A suitable organic oxidation catalyst is benzoyl peroxide.

It is desirable that no alkali be present during the reaction. A solvent inert to reactants and products may be employed if desired, for example, acetic acid or benzene.

The process of the invention provides a ready means of obtaining aliphatic lactones from cyclic ethers which are themselves readily obtainable from natural products. The aliphatic lactones are useful reactive chemical intermediates. The higher lactones polymerise readily and may be employed in the production of interpolymers. Butyrolactone is suitable for use as a solvent and as a starting material for the production of pyrolidene by reaction with ammonia under pressure.

The process of the invention is illustrated but not limited by the following examples.

Example 1

500 mls. of tetrahydrofuran and 5 gms. of cobalt naphthenate were heated to 140° C. under pressure and a stream of air was blown through the solution at a rate of about 100 litres per hour. The pressure in the vessel was about 120 lb. per square inch. After 5 hours the vessel was emptied and the product distilled to give a 40% yield of α-butyrolactone. About half of the tetrahydrofuran was recovered unchanged, while salts and acidic by-products were also obtained.

Example 2

440 gms. of tetrahydropyran, 5 gms. of cobalt naphthenate and 5 gms. of cyclohexanone were heated to 110°–125° C. at atmospheric pressure in an autoclave and a gentle stream of air was passed through the mixture for 2 hours. The product, weighing 484 gms. was distilled and there were obtained δ-valerolactone, unchanged tetrahydropyran, and formic acid. The yield of lactone calculated on tetrahydropyran was 62% by weight.

Example 3

450 gms. of tetrahydrofuran was heated to 90°–120° C. for 2½ hours while a stream of air was passed through it. The product, amounting to 563 gms. was distilled and there were obtained α-butyrolactone, unchanged tetrahydrofuran, and other undetermined products. The yield of α-butyrolactone was 56% by weight.

We claim:

1. A process for the production of aliphatic lactones comprising oxidizing a cyclic ether of the group consisting of tetrahydrofuran, tetrahydropyran and 2,5-dihydrofuran in the liquid phase at a temperature of 70–200° C. by means of an oxygen-containing gas.

2. The process of claim 1 wherein the temperature is 100–140° C.

3. The process of claim 1 wherein the oxidation is carried out under superatmospheric pressure.

4. The process of claim 3 wherein the pressure does not exceed 10 atmospheres gauge.

5. The process of claim 1 wherein the oxidation is carried out in the presence of an oxidation catalyst.

6. The process of claim 5 wherein the oxidation catalyst is a salt of an organic monocarboxylic acid.

7. The process of claim 6 wherein the oxidation is carried out under superatmospheric pressure and at a pressure not exceeding 10 atmospheres gauge.

8. The process of claim 1 wherein the cyclic ether is tetrahydrofuran.

9. The process of claim 1 wherein the cyclic ether is tetrahydropyran.

10. The process of claim 1 wherein the cyclic ether is 2,5-dihydrofuran.

JOHN GEORGE MACKAY BREMNER.
DAVID GWYN JONES.

REFERENCES CITED

The following references are of record in the file of this patent:

UNITED STATES PATENTS

| Number | Name | Date |
|---|---|---|
| 1,995,614 | Jaeger | Mar. 25, 1935 |

OTHER REFERENCES

Morton, The Chemistry of Heterocyclic Compounds, 2nd Impression (1946), page 10, McGraw Hill Book Co.